United States Patent
Ueda et al.

(10) Patent No.: US 6,878,432 B2
(45) Date of Patent: Apr. 12, 2005

(54) PANEL

(75) Inventors: Hiroki Ueda, Kobe (JP); Koji Fukumoto, Kobe (JP); Toshimitsu Tanaka, Kobe (JP); Akio Sugimoto, Kobe (JP); Akibumi Fujiwara, Kobe (JP); Kazuhisa Fujisawa, Kobe (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 0 days.

(21) Appl. No.: 10/137,401

(22) Filed: May 3, 2002

(65) Prior Publication Data

US 2003/0207086 A1 Nov. 6, 2003

(51) Int. Cl.$^7$ .............................. B32B 3/00; B32B 1/00; E04C 2/34; E04C 2/32; E04B 1/82
(52) U.S. Cl. ...................... 428/174; 428/172; 428/166; 428/179; 428/178; 428/217; 428/218; 52/793.1; 52/789.1; 181/284; 181/288; 181/290
(58) Field of Search .................................. 428/174, 172, 428/166, 179, 178, 217, 218; 52/793.1, 789.1; 181/284, 288, 290; 296/188, 189, 211; 180/69.2

(56) References Cited

U.S. PATENT DOCUMENTS

| 4,594,281 A | * | 6/1986 | Haraga et al. | 428/172 |
| 5,124,191 A |   | 6/1992 | Seksaria | 428/178 |
| 5,244,745 A |   | 9/1993 | Seksaria et al. | 428/593 |
| 5,351,940 A | * | 10/1994 | Yano et al. | 267/153 |

FOREIGN PATENT DOCUMENTS

| JP | 2000-168622 |   | 12/1998 |
| JP | 2001-122049 |   | 10/1999 |
| JP | 2001-122050 |   | 10/1999 |
| JP | 2001-122049 | * | 5/2001 |
| JP | 2001-122050 | * | 5/2001 |

* cited by examiner

Primary Examiner—Harold Pyon
Assistant Examiner—Catherine A. Simone
(74) Attorney, Agent, or Firm—Reed Smith L.L.P.; Stanley P. Fisher, Esq.; Juan Carlos A. Marquez, Esq.

(57) ABSTRACT

A panel structure for a transport machine is disclosed which is constituted by an integral combination of an outer panel and an inner panel. The inner panel has reinforcing protuberances and recesses, possessing a higher rigidity than the outer panel. The protuberances of the inner panel and a back side of the outer panel are bonded together through insulating layers present on the protuberances.

7 Claims, 8 Drawing Sheets

PANEL

BACKGROUND OF THE INVENTION

1. Field of the Invention

The present invention relates to a panel.

2. Description of the Related Art

As body panels of transport machines such as automobiles, aircraft, vehicles, and ships, there generally are used panel structures each comprising an exterior trim panel (outer panel or outer exposed panel) and an interior trim panel (inner panel or inner exposed panel) both combined together. For example, for automobile hood, doors and roof there are used panel structures each comprising a relatively thin outer panel for appearance and an inner panel for reinforcing the outer panel, both panels being combined together.

These panel structures are required to exhibit a noise insulating performance and a vibration damping performance in addition to such strength and rigidity as are inherently required as structures of transport machines and the like. For example, for the hood of an automobile or the like it is required to exhibit such a noise insulating effect as diminishes a wind noise of the automobile body and an engine noise generated within the body and thereby makes the travel of the automobile comfortable. For example, in common to transport machines such as automobiles, engine noises consist mainly of noises (especially booming noises) of low frequency band not higher than 1 kHz. Therefore, panel structures for transport machines and the like are required to diminish such noises.

However, as to a conventional panel structure comprising an inner panel and an outer panel combined together by fitting or mechanically and a conventional panel structure of the type in which protuberances of an inner panel and a surface of an outer panel are bonded together merely through an adhesive, it is impossible to so much expect an insulating effect against noises of the foregoing low frequency band.

This is because the conventional panel structures are expected to exhibit only an adhesive effect (bonding effect) and therefore the inner panel having protuberances is applied with an adhesive on only the tops of the protuberances, in other words, on only a quite limited area of the panel area.

On the other hand, vibration damping steel and aluminum panels are used for noise insulation and vibration damping. These damping panels are basically of a structure in which a resin layer is formed between two panels. The resin layer is effective in displaying a sound insulating performance and a vibration damping performance. In each of the vibration damping panels it is possible to provide the resin layer throughout the whole surface of the panel and at a required thickness and hence possible to ensure an amount of resin necessary for insulating noises of the foregoing low frequency band and damping vibrations.

However, for panels for transport machines such as automobiles there are performed press forming works involving strict forming conditions such as deep drawing, bulging, bending, and stretch flanging in order to make a blank into a complicated product shape. Therefore, a blank such as a steel or Al alloy plate, even in the form of a single plate, is required to possess a high deep drawability and a high shape fixability. But the foregoing laminated vibration damping panels do not possess such a high formability as that of a single blank and are thus not employable as panels for transport machines.

In the vibration damping panel, resin is filled between two panels throughout the whole panel surfaces, so that the damping panel becomes heavier than the aforesaid panel structure by an increased amount of resin resulting from the whole-surface filling of the resin. Consequently, a problem is encountered such that the meaning of using the panel structure for the reduction in weight of a transport machine is lost.

SUMMARY OF THE INVENTION

It is an object of the present invention to provide a panel structure using an inner panel formed with cone- or beam-like concaves and convexes, which panel structure is superior in noise insulating performance.

In a first aspect of the present invention there is provided a panel structure for a transport machine, comprising an integral combination of an outer panel and an inner panel. The inner panel has protuberances and recesses for reinforcement and is higher in rigidity than the outer panel. The protuberances of the inner panel and a back side of the outer panel are bonded together through resin layers which lie on the protuberances.

In a second aspect of the present invention there is provided, in combination with the above first aspect, a panel structure for a transport machine wherein the spacing between adjacent said protuberances is set at two thirds or less of a deformation half-wavelength of the outer panel.

In a third aspect of the present invention there is provided, in combination with the above first aspect, a panel structure for a transport machine wherein the resin layers have a Young's modulus of 0.05 to 0.5 MPa.

In a fourth aspect of the present invention there is provided, in combination with the above first aspect, a panel structure for a transport machine wherein the resin layers have a loss factor of preferably 0.3 or more.

In a fifth aspect of the present invention there is provided, in combination with the above first aspect, a panel structure for a transport machine wherein the resin layers have a loss factor of more preferably 0.5 or more.

In a sixth aspect of the present invention there is provided, in combination with the above first aspect, a panel structure for a transport machine wherein the resin layers are foamed.

In a seventh aspect of the present invention there is provided, in combination with the above first aspect, a panel structure for a transport machine wherein the resin layers are further dotted on back portions of the outer panel which portions correspond to the recesses of the inner panel.

In an eighth aspect of the present invention there is provided, in combination with the above first aspect, a panel structure for a transport machine wherein the Young's modulus of the resin layers lying on the protuberances located in a peripheral portion of the inner panel is set larger than Young's modulus of 0.05~0.5 MPa of the resin layers.

In a ninth aspect of the present invention there is provided, in combination with the above first aspect, a panel structure for a transport machine wherein the inner panel has truncated cone-shaped protuberances arranged regularly at predetermined certain intervals and each having a flat top.

According to the present invention it is possible to provide a panel structure using an inner panel formed with cone- or beam-like protuberances and recesses and superior in noise insulating performance.

DESCRIPTION OF THE PREFERRED EMBODIMENTS

A more concrete description will be given below about an inner panel with cone-like convexes (protuberances) arranged thereon at regular intervals, and a panel structure using the inner panel, as well as an inner panel with beam-like convexes (protuberances) arranged thereon, the beam-like protuberances extending planarly in longitudinal, transverse, and oblique directions, and a panel structure using the inner panel, according to the present invention.

Figure 4A:
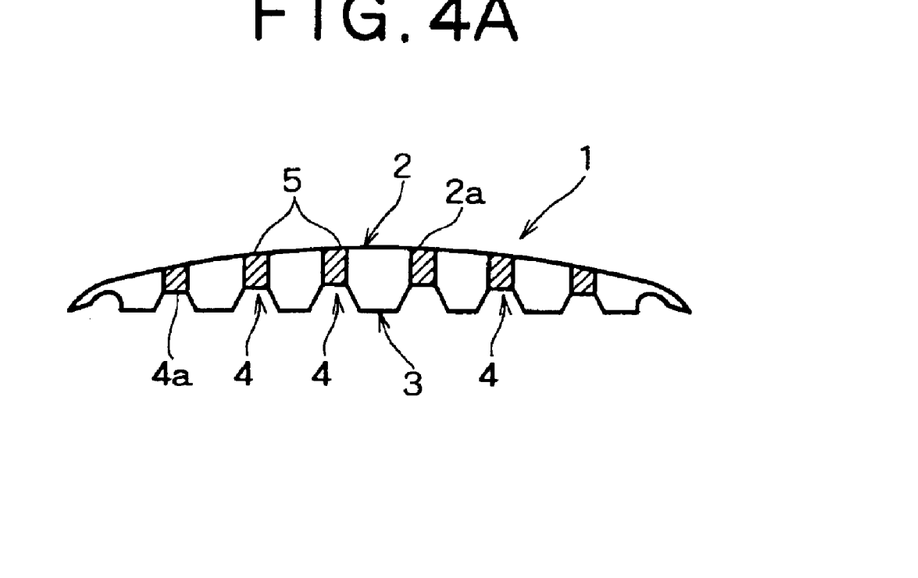
FIG. 4A and 4B are an explanatory diagram showing an inner panel formed with cone-like protuberances, as well as a panel structure using the inner panel, according to the present invention.
Figure 4B:
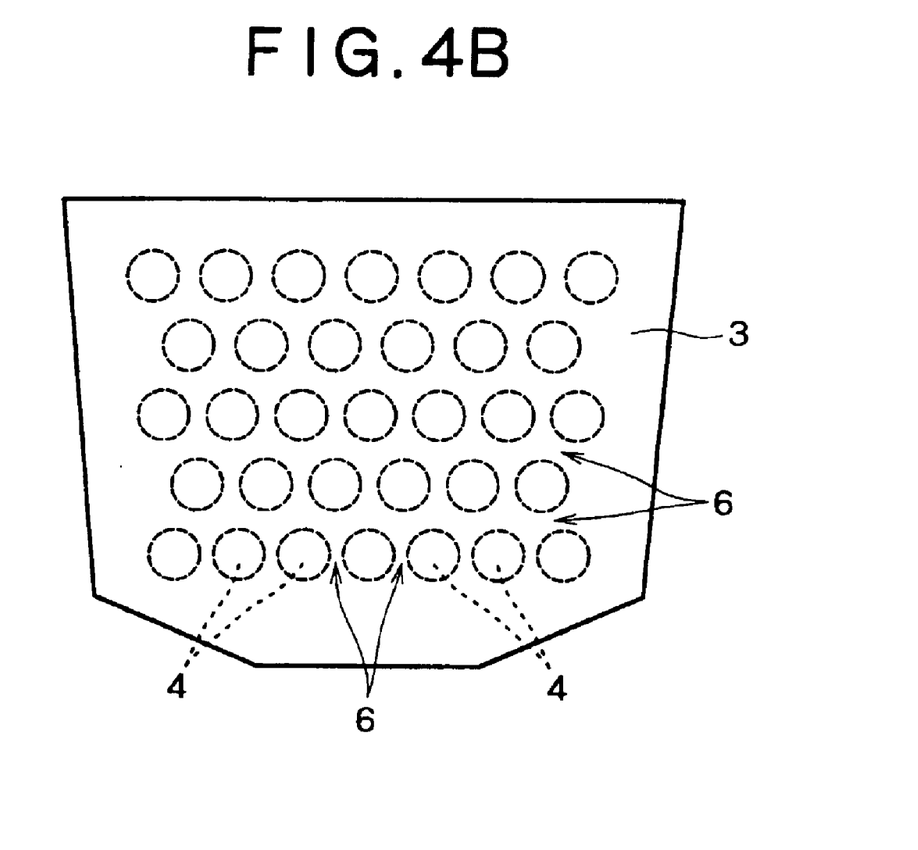

FIG. 4(*a*) is a longitudinal sectional view of a panel structure and FIG. 4(*b*) is a plan view of an inner panel. In FIG. 4(*a*), a panel structure 1 comprises an integral combination of an outer panel 2 made of an aluminum (Al) alloy and an inner panel 3 made of an Al alloy and having a higher rigidity than the outer panel. As shown in FIG. 4(*a*), the inner panel 3 has a large number of convexes (protuberances) 4 arranged at regular intervals and also has, as concaves, or recesses, 6, flat plate portions exclusive of the protuberances 4. Further, as shown in FIG. 4(*a*), resin layers 5 are disposed respectively on flat tops 4*a* of the protuberances 4 of the inner panel 3, and the protuberances 4 of the inner panel 3 and a back side 2*a* of the outer panel 2 are bonded together through the resin layers 5 as an adhesive.

Figure 5:
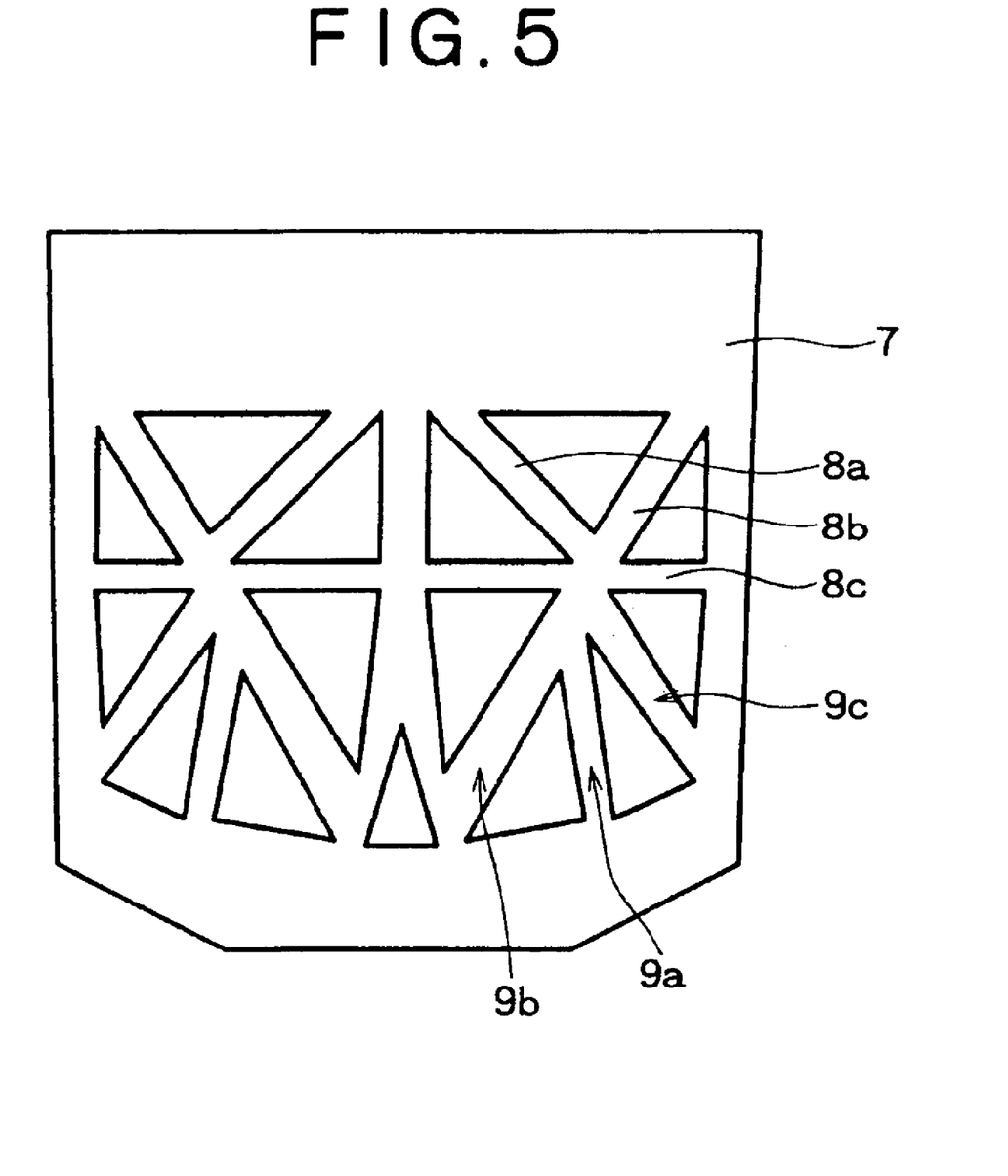
FIG. 5 is an explanatory diagram showing an inner panel formed with beam-like protuberances according to the present invention.

Although the above protuberances 4 are cone-shaped, FIG. 5 shows an example in which an inner panel 7 is provided with beam-like protuberances 8*a*, 8*b*, and 8*c* extending planarly in longitudinal, transverse, and oblique directions. Also in this example, like the example shown in FIG. 4, resin layers are disposed respectively on flat tops 9*a*, 9*b*, and 9*c* of the protuberances 8*a*, 8*b*, and 8*c* of the inner panel 7, though not shown, and the protuberances 8*a*, 8*b*, and 8*c* of the inner panel 7 and the back side of the outer panel are bonded together through the resin layers as an adhesive.

For combining both inner and outer panels into an integral panel structure there is used a known means such as fitting of the two by hemming (bending) peripheral edge portions of the panels, a mechanical bonding using bolts and nuts, or adhesion using resin or the like. For a panel structure using such an inner panel formed with cones or beams as mentioned above there is adopted a means wherein the tops of the cones or beams and the back side of an outer panel are bonded together with resin. Both inner and outer panels are thus combined into a panel structure (this type of a panel structure will hereinafter be referred to simply as "panel structure"), which ensures the rigidity required as panel.

In the panel structure according to the present invention wherein the resin layer is interposed between the protuberances of the inner panel and the back side of the outer panel, the resin layers function not only as a reinforcing element for enhancing the rigidity (resilience) of the outer panel but also as a damper element for damping the vibration of the outer panel.

If the Young's modulus of the resin layers is lowered, the reinforcing function of a noise insulating mechanism based on the resin layers which function enhances the rigidity (resilience) of the inner and outer panels is deteriorated. However, for example in a frequency band of not wider than 1 kHz, the noise insulating mechanism based on the resin layers functions to the greater extent as an outer panel vibration damping element. The damper effect of the resin layers becomes more outstanding by lowering the Young's modulus of the resin layer.

In the panel structure of the present invention, therefore, by lowering the Young's modulus of the resin layers, it is possible to enhance the vibration damping performance of the resin layers against vibrations of the outer panel, further ensure a required bondability (bonding strength) between the protuberances of the inner panel and the back side of the outer panel through the resin layers and ensure the rigidity required as a panel structure.

As to characteristics of the resin provided between the tops of cones or beams and the back side of the outer panel for enhancing the damping performance of the panel structure, Young's modulus (E) of the resin exerts the greatest influence thereon. A principal resin so far used as a bonding resin in this type of panel structures to satisfy such vibration damping and noise insulating performances as described above is a resin having a Young's modulus of about 0.7~2.0 MPa, e.g. polyvinyl chloride. A principal resin so far used in the foregoing vibration damping panel is such a resin as polyester or polyolefin having a Young's modulus of 1–10 MPa or so.

On the other hand, in the present invention, the young s modulus of the resin for bonding between the protuberances of the inner panel and the back side of the outer panel is set in the range of 0.05 to 0.5 MPa and is thus lower in comparison with that of the aforesaid conventional resin. However, also in this case, if the Young's modulus of the resin is smaller than 0.05 MPa, the vibration damping effect (noise insulating effect) against vibrations of the outer panel in a low vibration frequency band of not higher than 1 kHz, especially 100 to 400 Hz, is inferior and it is impossible to ensure the required bondability (bonding strength) between the protuberances of the inner panel and the back side of the outer panel by the resin. On the other hand, if Young's modulus of the resin exceeds 0.5 MPa, it is impossible to fully enhance the damping performance against vibrations of the outer panel (panel structure) in a frequency band of not higher than 1 kHz, especially 500 to 1000 Hz.

As to characteristics of the resin required for enhancing the damping performance of the panel structure, not only the above Young's modulus of the resin but also a loss factor of the resin is also influential. In the present invention, for enhancing the damping performance of the panel structure in a frequency band of not higher than 1 kHz, the loss factor of the resin is set preferably not smaller than 0.3, more preferably not smaller than 0.5.

If the loss factor of the resin is too small, even if Young's modulus of the resin is set within the range specified herein, the particularly in the case where the resin is disposed in only a very limited area of the panel area (the resin area is limited), it may be impossible, in a certain particular condition, to enhance the vibration damping performance against vibrations of the outer panel by the resin.

For setting Young's modulus and loss factor of the resin layers which bond the protuberances of the inner panel and the back side of the outer panel at the above Young's modulus and preferable loss factor, it is desirable to first select a resin from among polyester resins and polyether resins, then subject the resin thus selected to heat treatment or heating, allowing the resin to be foamed into a soft polyurethane foam, thereby making Young's modulus and loss factor of the resin low and high, respectively, and further reducing the weight thereof.

The resin may be used as it is or after modification using silicon for example. It is optional whether a single resin is to be used or plural resins are to be mixed together.

In the present invention, the resin layers are preferably provided on only the tops of the protuberances of the inner panel, whereby there can be attained a satisfactory noise insulating effect and a high bonding strength. But the resin layers may be provided also around the protuberances.

For example, in addition to the above basic mode, the resin layers may be further dotted on the back side of the outer panel at positions corresponding to the recesses of the inner panel. With the thus dotted resin layers, it is also possible to enhance the damping performance against vibrations of the outer panel.

Young's modulus of the resin layers lying on the protuberances located in a peripheral portion of the inner panel may be set larger than the foregoing Young's modulus of 0.05 to 0.5 MPa. With the resin layers lying on the peripheral protuberances, it is also possible to enhance the bonding strength between panels.

As to the material of the inner and outer panels used in the present invention, no special limitation is placed thereon. Steel and Al alloys used for panels of transport machines such as automobiles are employable.

For example, in the case of an Al alloy, a suitable one is selected which satisfies mechanical characteristics such as strength and elongation required for a panel of a transport machine, e.g., automobile, or which satisfies recyclability such as being small in the amount of alloy contained. More specifically, Al alloys usually employed for transport machine panels and relatively high in proof stress and press-formability into panel shapes, such as 3000, 5000, and 6000 series alloys, defined by AA (Aluminum Association of America) are preferred.

It is not necessary for both inner and outer panels to be of the same material. Suitable materials are selected in view of required strength and yield strength and required press-formability.

The Al alloy blank for panel itself is fabricated by melting Al alloy within the range of the Al alloy components specification and casting the resulting molten Al alloy in accordance with a conventional melt-casting method such as, for example, a continuous casting/rolling method or a semi-continuous casting method (DC casting method). Next, the resulting Al alloy ingot is subjected to a homogenizing heat treatment, followed by hot rolling, and if necessary, subsequent process annealing and cold rolling, further, annealing, solution treatment, and refining treatment such as quenching, to obtain an Al alloy blank having a desired thickness.

The Al alloy blank thus obtained is then subjected to a forming work such as press forming into predetermined inner and outer panel shapes. At this time, the inner panel is formed with protuberances and recesses for reinforcing the outer panel and for possessing a higher rigidity than that of the outer panel. The shape of such protuberances and recesses is not specially limited. For example, a suitable one is selected from among such cone-shaped protuberance as shown in FIGS. 4(a) and (b), such beam-shaped protuberance as shown in FIG. 5, and a combination of both protuberances.

After this forming work, resin layers having the predetermined characteristics specified herein are provided respectively on the protuberances of the inner panel, and the protuberances of the inner panel and the back side of the outer panel are bonded together through the resin layers into an integral panel structure. At this time, in addition to the bonding through the resin layers, peripheral edges of the inner and outer panels may be subjected to hemming (bending), or a conventional mechanical bonding using bolts or the like may be performed, to ensure the bonding.

For foaming the resin after bonding the protuberances of the inner panel and the back side of the outer panel with each other through the resin, without using a pre-foamed resin, it is preferable to heat the panels to an appropriate resin foaming temperature. For example, if the panel structure (especially outer panel) manufacturing process goes through a heat treatment step for baking and curing of a coating material after coating the panel structure, the aforesaid heating for the panels may be performed by the heat treatment step just mentioned above (i.e., by borrowing the step).

Usually, in a panel structure for a transport machine wherein an outer panel, as well as an inner panel and reinforcing beams, are rendered integral by mechanical bonding, a sound (noise) from the panel structure is generated by a large vibration of the outer panel which is more likely to vibrate than the highly rigid inner panel and the reinforcing beams because mechanical vibrations such as traveling vibrations of the transport machine and vibrations of the engine are transmitted to the outer panel.

Therefore, in such a panel structure, a noise insulating effect can be displayed if the vibration of the outer panel which is more likely to vibrate than the inner panel is suppressed or damped.

In panel structures, however, even under the same resin layer conditions, the vibration damping performance of the bonding resin layer against vibrations of the outer panel differs greatly depending on the frequency band of vibrations of the outer panel (depending on the frequency band of a vibration source such as an engine).

First, as a premise, in such a panel structure according to the present invention having an interposed resin layer as in FIG. 4, the resin layer acts as both a reinforcing element which enhances the rigidity (resilience) of the outer panel and a damper element which damps vibrations of the outer panel.

Figure 10A:
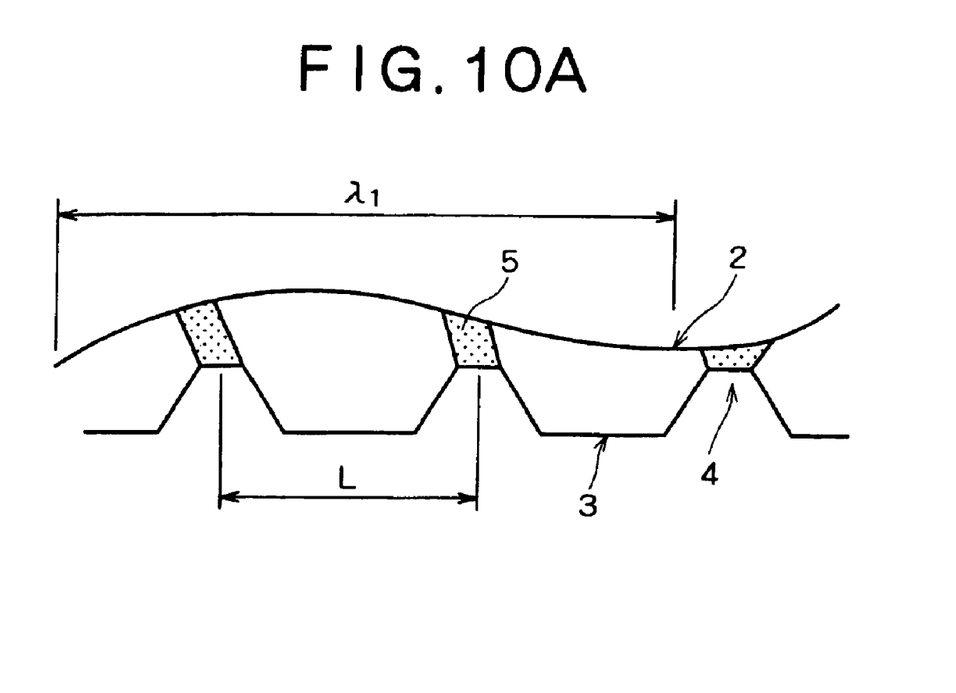
FIG. 10A and 10B are an explanatory diagram showing a relation between a deformation half-wavelength of an outer panel and the spacing of protuberances.

If a deformation half-wavelength based on vibrations of the outer panel is assumed to be λ, then, for example, a deformation half-wavelength λ1 of the outer panel in a low frequency band in the frequency band of not higher than 1 kHz becomes larger (longer) than the spacing (pitch) L of the resin layers 5 which corresponds to a commonly-used pitch of the protuberances 4 (concaves and convexes) of the inner panel 3 as shown in FIG. 10(a) because of a low frequency f. Consequently, deformation of the outer panel 2 also causes deformation of the resin layers 5, so that a strain energy sharing rate of the resin layers which strain is caused by deformation of the outer panel 2 becomes high and the resin layers 5 act effectively as a damper for enhancing the damping performance against vibrations of the outer panel 2. In other words, in the low frequency band in question, the resin layers 5 act effectively as a damper for enhancing the damping performance against vibrations of the outer panel 2 at a commonly-used spacing (1/1 or more for λ) of protuberances 4 of the inner panel 3.

Figure 10B:
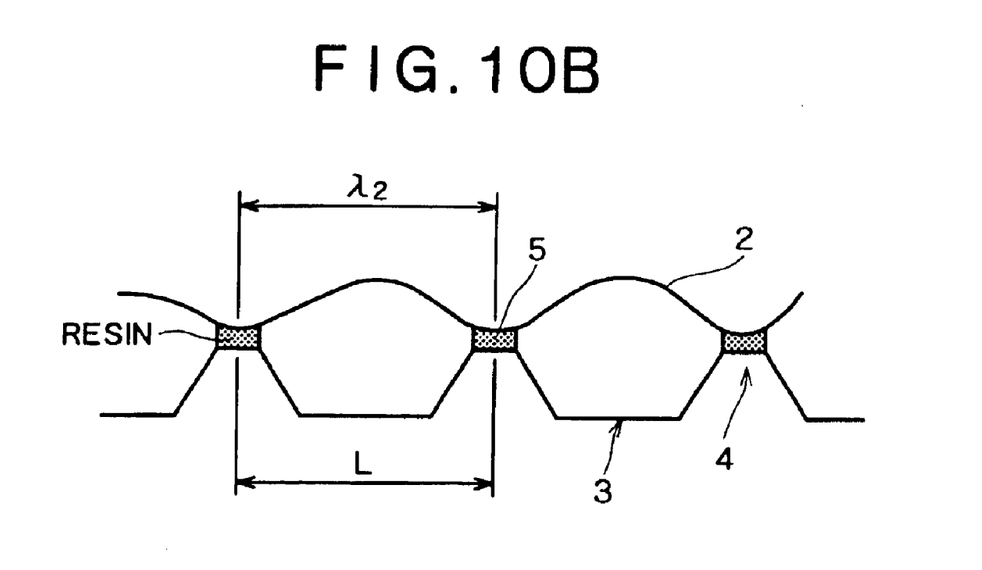

On the other hand, in a high frequency band in the frequency band of not higher than 1 kHz, a deformation half-wavelength λ2 of the outer panel becomes smaller than the spacing (pitch) L of the resin layers 5 which pitch corresponds to the commonly-used pitch of the protuberances 4 of the inner panel 3 as shown in FIG. 10(b) because of a high frequency f. Therefore, even with deformation of the outer panel 2, the resin layers 5 are not deformed, so that the strain energy sharing rate of the resin layers which strain is caused by deformation of the outer panel 1 becomes low and the resin layers 5 no longer act effectively as a damper for enhancing the damping performance against vibrations of the outer panel. Consequently, at the commonly-used spacing (1/1 or more for λ) of the inner panel 3 the resin layers 5 become difficult to be deformed and no longer act effectively for enhancing the damping performance against vibrations of the outer panel 2 (panel structure).

Figure 11:
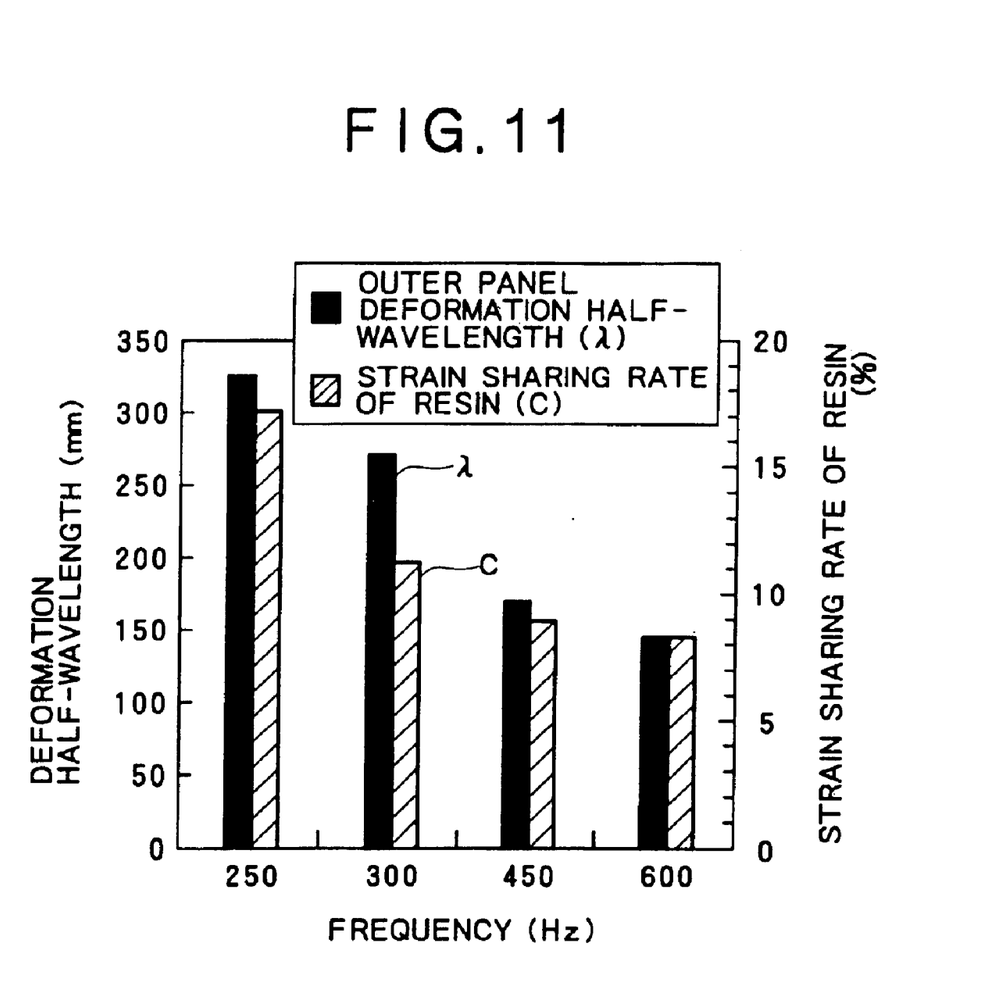
FIG. 11 is an explanatory diagram showing a relation between a deformation half-wavelength of an outer panel and a strain sharing rate of resin.

A further description on this point will now be given with reference to FIG. 11. FIG. 11 illustrates a deformation half-wavelength λ of the outer panel and a strain energy sharing rate (a strain sharing rate of resin) C of the resin layers which strain is caused by deformation of the outer panel at various vibration frequencies of the outer panel in an Al alloy panel structure according to the present invention having interposed resin layers as in FIG. 4. In FIG. 11, as the frequency f becomes lower from 600 to 250 Hz, the deformation half-wavelength based on vibrations of the outer panel becomes larger and the strain sharing rate C of the resin also increases. It is seen that in the frequency band of not higher than 1 kHz and in the case of an outer panel vibration frequency of not lower than 450 Hz, the strain sharing rate A of the resin decreases markedly and that the resin layers no longer act effectively for enhancing the damping performance against vibrations of the outer panel (panel structure).

In FIG. 11, a panel structure (Young's modulus of resin is 0.3 MPa) made of Al alloy was simulated under the same conditions as in a working example to be described later to prepare a simple vibration model in which Al panels and resin were connected in series, and strain sharing rates of resin were determined by eigenvalue analysis in accordance with a finite element method for this model.

In the case where the deformation half-wavelength λ2 of the outer panel 2 becomes small (short) in the frequency band of not higher than 1 kHz, the positions of the resin layers becomes close to support points (fixed points). In this case, if Young's modulus of the resin layers is high (rigidity of the resin layers is high), the positions of the resin layers simply support the outer panel, no longer exhibiting an effective function for enhancing the damping performance of the resin layers against vibrations of the outer panel (panel structure).

Under the circumstances the present inventor has found out that the noise insulating performance is improved by setting the spacing between protuberances (in other words, between resin layers) in the reinforcing concave/convex portion of the inner panel at two thirds or less of the deformation half-wavelength of the outer panel. In conventional panel structures of this type, the spacing between protuberances in the reinforcing concave/convex portion of the inner panel is 1/1 or more of the deformation half-wavelength of the outer panel.

By setting the spacing between protuberances (in other words, between resin layers) in the reinforcing concave/convex portion of the inner panel at two thirds or less of the deformation half-wavelength of the outer panel, particularly in the frequency band of not higher than 1 kHz, the deformation half-wavelength λ of the outer panel in the frequency band of not lower than 1 kHz becomes larger (longer) than the spacing (pitch) L of resin layers which corresponds to the commonly-used concave/convex pitch of the inner panel as shown in FIG. 10(a). As a result, deformation of the outer panel causes deformation of the resin layers, so that the strain energy sharing rate of the resin layers which strain is induced by deformation of the outer panel becomes high and the resin layers act effectively as the damper for enhancing the damping performance against vibrations of the outer panel.

Besides, in the frequency band of not higher than 1 kHz, the positions of the resin layers no longer become close to the support points (fixed points) relative to the deformation half-wavelength A of the outer panel, that is, the positions of the resin layers do not simply support the outer panel, so that the resin layers act effectively for enhancing the damping performance against vibrations of the outer panel.

In the panel structure according to the present invention, by suitably adjusting the spacing between convexes (in other words, between resin layers) in the reinforcing concave/convex portion of the inner panel, the damping performance against vibrations of the outer panel is enhanced and the bondability (bonding strength) between the protuberances of the inner panel and the back side of the outer panel through the resin layers is ensured, thereby ensuring the rigidity required for the panel structure.

Thus, in the present invention, for enhancing the damping performance of against vibrations of the outer panel it is desirable that the spacing between protuberances (in other words, between resin layers) in the reinforcing concave/convex portion of the inner panel be set at two thirds or less of the deformation half-wavelength of the outer panel.

If the spacing between adjacent protuberances exceeds two thirds of the deformation half-wavelength of the outer panel, the deformation half-wavelength of the outer panel becomes smaller than the spacing (pitch) between adjacent resin layers at a high frequency band in the frequency band of not higher than 1 kHz. Consequently, as noted earlier, the resin layers are not deformed even if the outer panel is deformed, so that the strain energy sharing rate of the resin layers which strain is caused by deformation of the outer panel becomes low and the resin layers no longer act effectively as the damper for enhancing the damping performance against vibrations of the outer panel. Further, the positions of the resin layers become close to support points (fixed points), therefore, as noted earlier, if Young's modulus of the resin layers is high (rigidity of the resin layers is high), the positions of the resin layers simply support the outer panel and the resin layers no longer act effectively for enhancing the damping performance against vibrations of the outer panel (panel structure). The deformation half-wavelength λ of the outer panel can be obtained from the following equation:

$$\lambda = 2\pi^4 \sqrt{\frac{Eh^2}{12(1-v^2)\rho(2\pi f)^2}} \quad \text{(Eq. 1)}$$

Where, E: Young's modulus of the outer panel h: thickness of the outer panel v: Poisson's ratio ρ: specific gravity of the outer panel f: frequency relative to the panel thickness h

EXAMPLE 1

Example 1 of the present invention will now be described. A panel structure (square, 1400 mm×1400 mm) according to the present invention shown in FIGS. 4(a) and (b) was provided. AA 6111 Al alloy panels were used as both outer and inner panels. More specifically, the outer panel was formed as a 1 mm thick flat panel by press forming, while the inner panel was formed as a flat panel (0.8 mm thick) by press forming in such a manner that cone-like protuberances each having a lower portion diameter of 140 mm, having a flat top and having a height of 25 mm were arranged at intervals of 170 mm. The inner panel was made higher in rigidity than the outer panel.

Resin layers were arranged respectively at flat tops (20 mm dia.) of cone-like protuberances of the inner panel, the thickness of each resin layer (clearance between the flat tops of the protuberances and a back side of the outer panel) was set at 5 mm, and the protuberances of the inner panel and the back side of the outer panel were bonded together through the resin layers. Further, peripheral edges of the outer and inner panels were subjected to hemming (bending) into an integral panel structure.

Panel structures of such a construction having different Young's modulus and loss factors of resin layers were provided by using such resins and foaming conditions as shown in Table 1 below. In a suspended state of each of these panel structures, the inner panel was vibrated by means of a vibration generator, causing vibration of the outer panel, and the amplitude for each vibration frequency band of the outer panel was measured, which measured value was then evaluated as the magnitude of a damping effect (noise insulating effect) of the resin layers against vibrations of the outer panel. Results obtained are shown in FIGS. 1 and 2.

Further, in each of the panel structures, when the protuberances of the inner panel and the back side of the outer panel were bonded together using the resin layers as an adhesive (before hemming of peripheral edges of both inner and outer panels), a bonding strength was evaluated in terms of a shear strength, which evaluation was made in the following manner. An average shear strength, 5.0 MPa or so, of a polyvinyl chloride resin with high Young's modulus and with importance attached to bonding strength, which has so far been used, was used as a reference value and one having a shear strength of 5.0 MPa or more was marked with ⊙, one in the range of 1 to 5 MPa with ◯, one in the range of 0.5 to 1.0 MPa with Δ, and one less than 0.5 MPa with ×. Results of the evaluation are also set out in Table 1.

Figure 1:
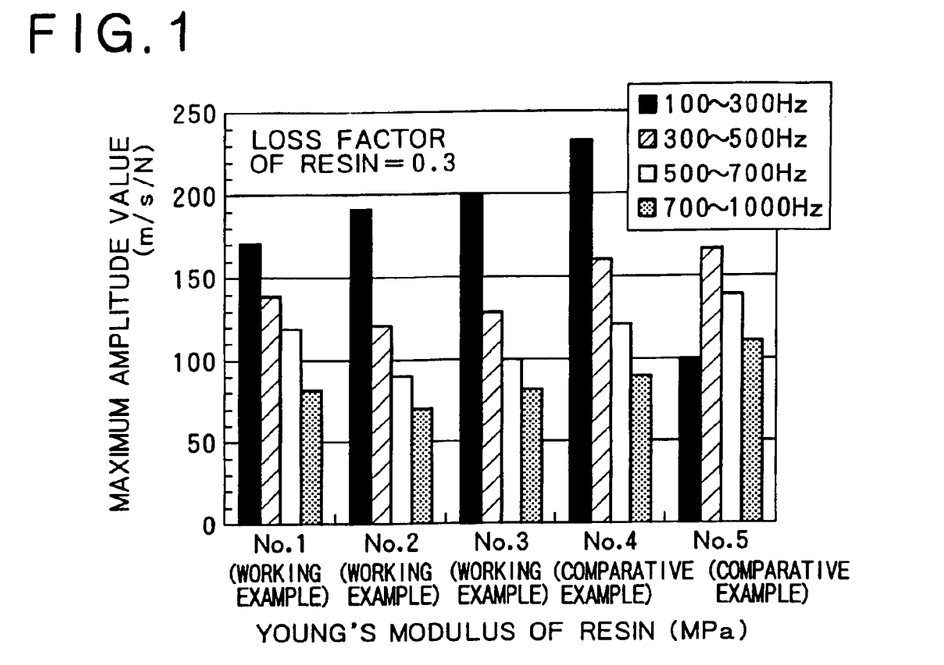
FIG. 1 is an explanatory diagram showing a vibration damping effect of an outer panel embodying the present invention.
Figure 2:
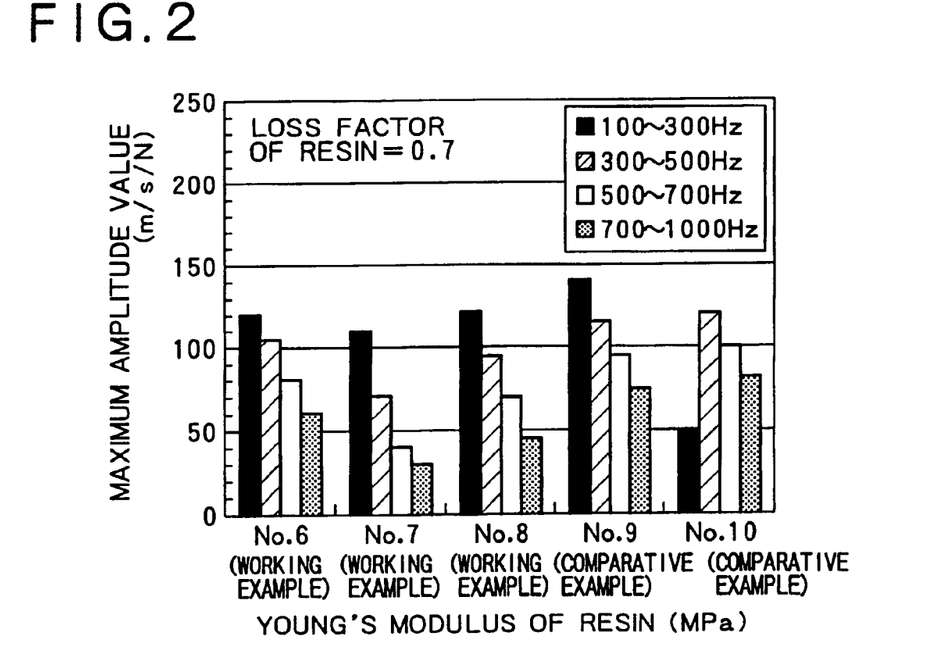
FIG. 2 is an explanatory diagram showing a vibration damping effect of an outer panel embodying the present invention.

As is seen from FIGS. 1 and 2 (by comparison in both figures each having the same resin loss factor), working example No. 1, 2, 3, 6, 7, and 8 with Young's modulus of resin layers falling under the range of 0.05 to 0.5 MPa defined in the present invention are superior in a damping effect against vibrations of the outer panel at a vibration frequency of not higher than 1 kHz (100~1000 Hz) and are superior also in the bonding strength of resin. Even among the working examples, however, No. 3 and 8 with resin layers' Young's modulus corresponding to the lower limit of 0.05 MPa are low in bonding strength in comparison with the other working examples.

Further, a comparison between the group of FIG. 1 and that of FIG. 2 shows that even at the same Young's modulus of resin layers, the working example No. 6, 7, and 8 (FIG. 2) high in loss factor which is 0.7 is superior in the damping effect (noise insulating effect) against vibrations of the outer panel to the comparative example No. 1, 2, and 3 relatively low in loss factor which is 0.3.

On the other hand, as is seen from FIGS. 1 and 2, the comparative example No. 4 and 9, which are lower in resin layers' Young's modulus than the lower limit of 0.05 MPa specified herein as in Table 1, are inferior in the damping effect (noise insulating effect) against vibrations of the outer panel particularly at a low vibration frequency band of 100 to 400 Hz and are low also in the bonding strength, and thus their panel structures are not employable practically. Also as to the comparative example No. 5 and 10, which are higher in resin layers' Young's modulus than the upper limit of 0.5MP specified herein, they are high in bonding strength, but are markedly inferior in the damping effect (noise insulating effect) against vibrations of the outer panel at a low vibration frequency band of 500 to 1000 Hz as is apparent from FIGS. 1 and 2.

Figure 3:
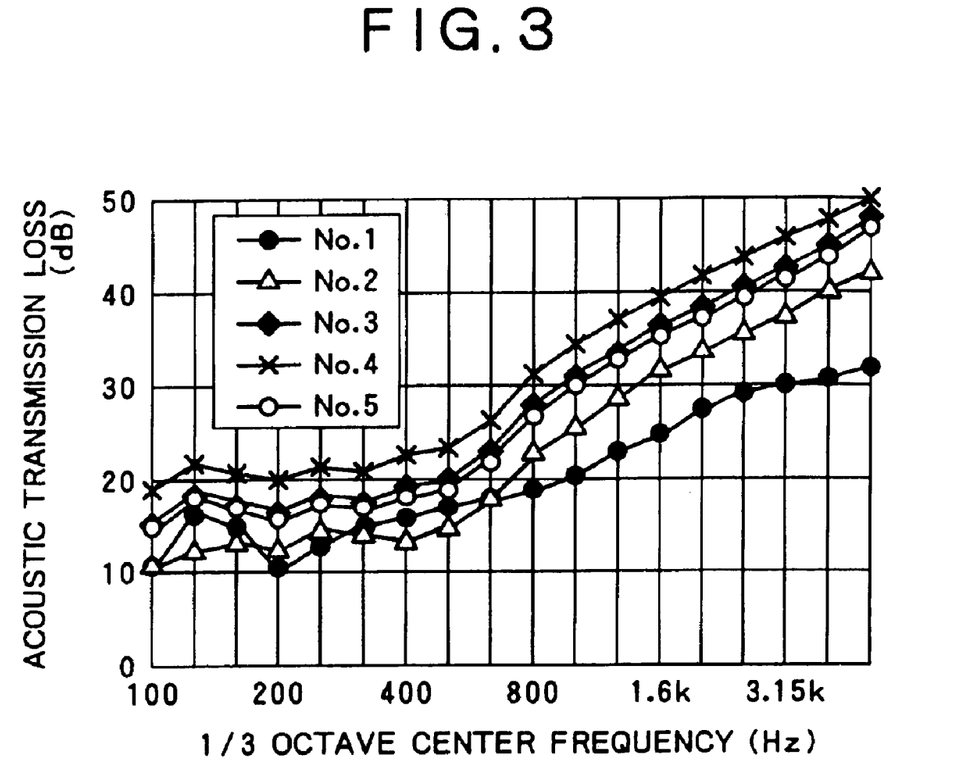
FIG. 3 is an explanatory diagram showing an acoustic transmission loss of a panel structure embodying the present invention.

Further, FIG. 3 shows an acoustic transmission loss effect (No. 3 in FIG. 3) for each vibration frequency band (including the vibration frequency band of not higher than 1 kHz) higher than that in the working example No. 2. In addition to the working example No. 2 there were also provided a working example (No. 4 in FIG. 3) wherein resin layers (Young's modulus 0.1 MPa, loss factor 0.3) each 50 mm×50 mm and 5 mm in thickness were affixed dottedly to back side portions of the outer panel corresponding to recesses of the inner panel, in addition to the arrangement of resin layers in the working example No. 2, and a working example (No. 5 in FIG. 3) wherein only the resin layers lying on the protuberances located at the outermost periphery of the inner panel were set at Young's modulus as large as 1.0 MPa (loss factor 0.3), in addition to the arrangement of resin layers in the working example No. 2.

For comparison purpose, a panel structure (No. 2 in FIG. 3) having the conventional resin layers high in Young's modulus shown in FIG. 4 and a conventional panel structure (No. 1 in FIG. 3) of the type having an outer panel back reinforced by plural beams (reinforcing beams) are also shown in FIG. 3 with respect to their acoustic transmission losses for each vibration frequency band of the outer panel.

Reference to FIG. 3 shows that panel structures according to the present invention (No. 3, 4, and 5 in FIG. 3) are superior in acoustic transmission loss effect and noise insulating effect for each vibration frequency band of the outer panel in comparison with conventional panel structure No. 1 and 2 in FIG. 3 not only in the frequency band of not higher than 1 kHz but also in a high vibration frequency band. This tendency is also true of the working example (No. 4 in FIG. 3) wherein resin layers are further dotted on the outer panel back portions corresponding to the recesses of the inner panel and the working example (No. 5 in FIG. 3) wherein young's modulus of resin layers on the protuberances located in the peripheral portion of the inner panel.

Further, a comparison among examples (No. 3, 4, and 5 in FIG. 3) shows that the working example (No. 4 in FIG.

3) with resin layers not only present on the protuberances of the inner panel but also dotted on the outer panel back portions corresponding to the recesses of the inner panel is relatively high in noise insulating effect as compared with the working example (No. 3 in FIG. 3) with resin layers lying on only the protuberances of the inner panel. It is also seen that the working example (No. 5 in FIG. 3) with Young s modulus of resin layers on the protuberances located in the peripheral portion of the inner panel set at as large as 1.0 MPa is high in bonding strength based on the resin layers but is relatively low in noise insulating effect as compared with the working example No. 3 in FIG. 3.

TABLE 1

| No. | Application | Type of Resin | Resin Characteristics Young's Modulus (Mpa) | Loss Factor | Bonding Strength of Resin |
|---|---|---|---|---|---|
| 1 | Working Example | Rigid PVC-based polyurethane foam | 0.3 | 0.3 | ○ |
| 2 | Working Example | Soft polyester-based polyurethane foam | 0.1 | 0.3 | ○ |
| 3 | Working Example | Soft polyester-based polyurethane foam | 0.05 | 0.3 | Δ |
| 4 | Comparative Example | Soft polyester-based polyurethane foam | 0.01 | 0.3 | x |
| 5 | Comparative Example | Unfoamed soft polyester resin | 1.0 | 0.3 | ⊙ |
| 6 | Working Example | Rigid PVC-based polyurethane foam | 0.3 | 0.7 | ○ |
| 7 | Working Example | Soft polyether-based polyurethane foam | 0.1 | 0.7 | ○ |
| 8 | Working Example | Soft polyether-based polyurethane foam | 0.05 | 0.7 | Δ |
| 9 | Comparative Example | Soft polyether-based polyurethane foam | 0.01 | 0.7 | x |
| 10 | Comparative Example | Unfoamed soft polyether resin | 1.0 | 0.7 | ⊙ |

EXAMPLE 2

Example 2 of the present invention will now be described. A panel structure (square, 1400 mm×1400 mm) according to the present invention shown in FIGS. 4(a) and (b) was provided. AA 6111 Al panels were used as both outer and inner panels. More specifically, the outer panel was formed as a 1 mm thick flat panel by press forming, while the inner panel was formed as a flat panel (0.8 mm thick) by press forming in such a manner that cone-like protuberances each having a lower portion diameter of 140 mmφ, having a flat top and having a height of 25 mm were arranged at intervals of 170 mm. The inner panel was made higher in rigidity than the outer panel.

There were provided three working examples having inner panel protuberances' spacing of ⅔ in the working example 11 (FIG. 6), ½ in the working example 12 (FIG. 7), and ½ in the working example 13 (FIG. 8), respectively, relative to the deformation half-wavelength λ of the outer panel. There also was provided a comparative example 14 (FIG. 9) having an inner panel protuberances' spacing of 1/1 relative to the deformation wavelength λ.

For resin layers in the working examples 11, 12 and comparative example 14 there was used a soft polyester-based polyurethane foam having a Young's modulus after foaming of 0.3 MPa. For resin layers in the working example 3 there was used a rigid urethane resin having a Young's modulus of 3.0 MPa. In each example there were provided two panel structures having resin layers' loss factors η of 0.3 and 0.6, respectively. In each example, the resin layers were arranged on flat tops (20 mm φ dia.) of the inner panel's cone-like protuberances, and with the resin layers as an adhesive, the cone-like protuberances of the inner panel and the back side of the outer panel were bonded together. The resin layers in the working examples 11, 12 and comparative example 14 were heated to the foaming temperature of the resin after bonding. Further, peripheral edges of the outer and inner panels in each of the examples were subjected to hemming (bending) into an integral panel structure.

Then, in a suspended state of each of these panel structures, the inner panel was vibrated by means of a vibration generator, causing vibration of the outer panel, and a loss factor of vibration for each vibration frequency band of the outer panel was measured, which measured value was then evaluated as the magnitude of a damping effect (noise insulating effect) of the resin layers against vibrations of the outer panel. Results obtained are shown in FIGS. 6, 7, 8, and 9.

Further, in each of the panel structures, when the protuberances of the inner panel and the back side of the outer panel were bonded together using the resin layers as an adhesive (before hemming of peripheral edges of both inner and outer panels), a bonding strength was evaluated in terms of a shear strength. The evaluation was made using an average shear strength, 5.0 MPa or so, of a polyvinyl chloride resin with high Young's modulus and with importance attached to bonding strength, which has so far been used. There were obtained satisfactory results.

Figure 6:
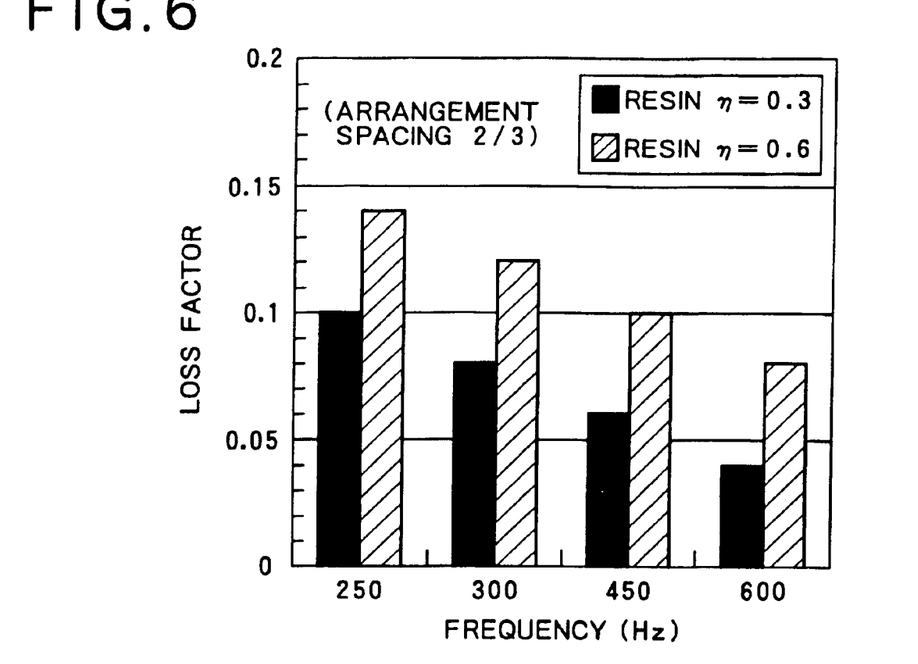
FIG. 6 is an explanatory diagram showing a further example (working example) according to the present invention.
Figure 7:
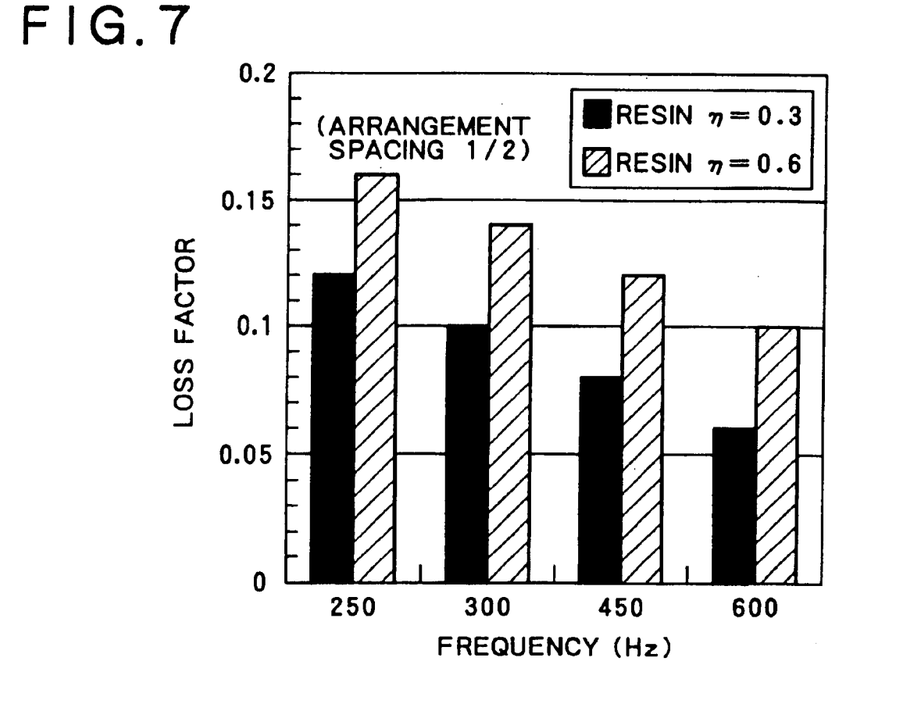
FIG. 7 is an explanatory diagram showing a further example (working example) according to the present invention.
Figure 8:
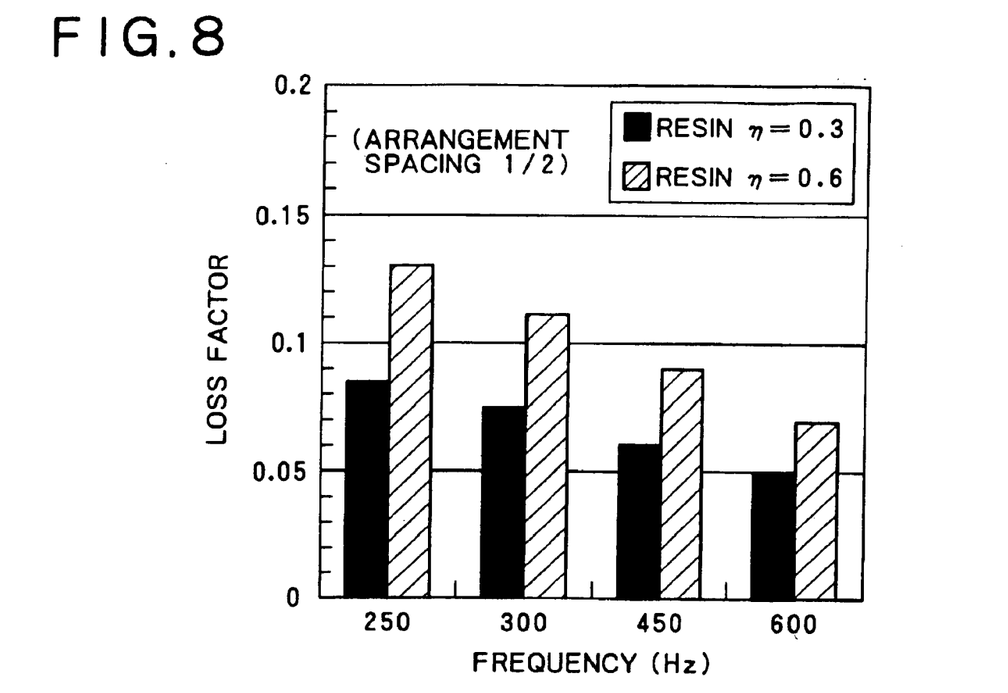
FIG. 8 is an explanatory diagram showing a further example (working example) according to the present invention.
Figure 9:
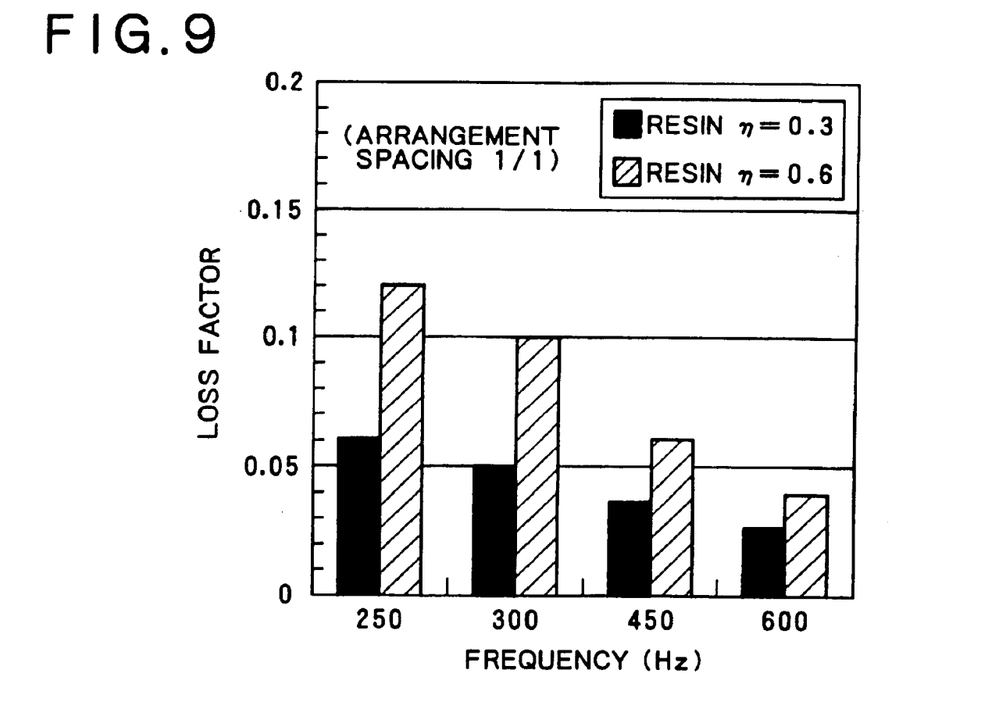
FIG. 9 is an explanatory diagram showing a further example (comparative example) according to the present invention.

From these results it is seen that the working examples 11 to 13 shown in FIGS. 6 to 8, wherein the inner panel protuberances' spacing was set at two thirds or less relative to the deformation half-wavelength of the outer panel, are superior in a damping effect against vibrations of the outer panel and a noise insulating effect (loss factor) in a vibration frequency band of not higher than 1 kHz (250~600Hz) as compared with the comparative example 14 shown in FIG. 9 in which the inner panel protuberances' spacing was set at 1/1 relative to the deformation half-wavelength of the outer panel.

A comparison between the resin loss factors η of 0.3 and 0.6 in each drawing shows that the higher resin loss factor η of 0.6 affords superior vibration damping effect and noise insulating effect in the outer panel vibration frequency band of not higher than 1 kHz (250~600 Hz).

A comparison of resin layers having the same Young's modulus shows that the working example 12 (FIG. 7) having a smaller inner panel protuberances' spacing of ½ relative to the deformation wavelength λ of the outer panel is superior in noise insulating effect at the outer panel vibration frequency band of not higher than 1 kHz (250~600 Hz) as compared with the working example 13 (FIG. 8) having a relatively large inner panel protuberances' spacing of ⅔.

Further, a comparison of resin layers having the same inner panel protuberances' spacing shows that the working example 12 (FIG. 7) having a low young's modulus of 0.3 MPa is superior in noise insulating effect at the outer panel vibration frequency band of not higher than 1 kHz (250~600 Hz) as compared with the working example 13 (FIG. 8) having a relatively large young's modulus of 3.0 MPa.

We claim:

1. A panel comprising an integral combination of an outer panel and an inner panel, said inner panel having protuberances and recesses for reinforcement and being higher in rigidity than said outer panel, said protuberances of the inner panel and a back side of said outer panel being bonded together through resin layers present on the protuberances, wherein spacing adjacent between said protuberances is set at two thirds or less of a deformation half-wavelength $\lambda$ of said outer panel.

2. A panel according to claim 1, wherein said resin layers have a loss factor of not smaller than 0.3.

3. A panel according to claim 1, wherein said resin layers have a loss factor of not smaller than 0.5.

4. A panel according to claim 1, wherein said resin layers are foamed.

5. A panel according to claim 1, wherein said resin layers are further dotted on the back portions of said outer panel corresponding to the recesses of the said inner panel.

6. A panel according to claim 1, wherein Youngs's modulus of said resin layers on the protuberances located in a peripheral portion of said inner panel is set larger than Young's modulus of 0.05 to 0.5 MPa of the resin layers.

7. A panel according to claim 1, wherein inner panel has truncated cone-shaped protuberances arranged regularly at predetermined certain intervals and each having a flat top.

* * * * *